US009702380B2

(12) United States Patent
Kojima et al.

(10) Patent No.: US 9,702,380 B2
(45) Date of Patent: Jul. 11, 2017

(54) FLUID PRESSURE CONTROL DEVICE FOR POWER SHOVEL

(71) Applicant: KAYABA INDUSTRY CO., LTD., Tokyo (JP)

(72) Inventors: Masanari Kojima, Kanagawa (JP); Masayuki Nakamura, Kanagawa (JP); Takeshi Terao, Kanagawa (JP)

(73) Assignee: KYB Corporation, Tokyo (JP)

( * ) Notice: Subject to any disclaimer, the term of this patent is extended or adjusted under 35 U.S.C. 154(b) by 328 days.

(21) Appl. No.: 14/441,097

(22) PCT Filed: Nov. 6, 2013

(86) PCT No.: PCT/JP2013/079972
§ 371 (c)(1),
(2) Date: May 6, 2015

(87) PCT Pub. No.: WO2014/073551
PCT Pub. Date: May 15, 2014

(65) Prior Publication Data

US 2015/0285274 A1 Oct. 8, 2015

(30) Foreign Application Priority Data

Nov. 7, 2012 (JP) ................................ 2012-245070

(51) Int. Cl.
*F16D 31/02* (2006.01)
*F15B 11/17* (2006.01)
(Continued)

(52) U.S. Cl.
CPC ............ *F15B 11/17* (2013.01); *E02F 9/2239* (2013.01); *E02F 9/2282* (2013.01);
(Continued)

(58) Field of Classification Search
CPC ....... F15B 11/167; F15B 11/17; E02F 9/2239; E02F 9/2285
(Continued)

(56) References Cited

U.S. PATENT DOCUMENTS 6,330,797 B1 * 12/2001 Kondo .................. E02F 9/2239 60/421
6,799,424 B2 * 10/2004 Ioku ...................... E02F 9/2239 60/420
(Continued)

FOREIGN PATENT DOCUMENTS

JP S54-164391 U 11/1979
JP H10-88627 A 4/1998
(Continued)

*Primary Examiner* — Michael Leslie
(74) *Attorney, Agent, or Firm* — Rabin & Berdo, P.C.

(57) ABSTRACT

A fluid pressure control device for a power shovel including first, second, and third pumps, a first switching valve connected to the first pump, a second switching valve connected to the second pump, a first merge control valve connected to the third pump, and a second merge control valve provided downstream of the first merge control valve, in which the first merge control valve is switched by a pilot pressure of the first switching valve or the second switching valve to enable communication between the third pump and a downstream side, and the second merge control valve is switched by a pilot pressure of the second switching valve to block communication between the third pump and the first switching valve.

4 Claims, 3 Drawing Sheets

(51) Int. Cl.
*F15B 11/16* (2006.01)
*E02F 9/22* (2006.01)

(52) U.S. Cl.
CPC .......... *E02F 9/2285* (2013.01); *E02F 9/2292* (2013.01); *F15B 11/167* (2013.01); *F15B 2211/20576* (2013.01); *F15B 2211/30595* (2013.01); *F15B 2211/329* (2013.01); *F15B 2211/7142* (2013.01)

(58) Field of Classification Search
USPC .................................................... 60/421, 429
See application file for complete search history.

(56) References Cited

U.S. PATENT DOCUMENTS

| | | | | |
|---|---|---|---|---|
| 9,057,175 | B2 * | 6/2015 | Saotome | E02F 9/2239 |
| 9,181,677 | B2 * | 11/2015 | Saotome | E02F 9/2239 |
| 2006/0266029 | A1 * | 11/2006 | Asakage | E02F 9/2239<br>60/486 |

FOREIGN PATENT DOCUMENTS

| | | | |
|---|---|---|---|
| JP | 2005-121043 | A | 5/2005 |
| JP | 2006-328765 | A | 12/2006 |
| JP | 2012-036909 | A | 2/2012 |

* cited by examiner

FLUID PRESSURE CONTROL DEVICE FOR POWER SHOVEL

TECHNICAL FIELD

The present invention relates to a fluid pressure control device for a power shovel.

BACKGROUND ART

In one known hydraulic control circuit for a power shovel, first to third circuit systems are respectively connected to first to third pumps and discharged oil from the third pump is made to merge into the first and second circuit systems as necessary.

A control circuit disclosed in JP1998-88627A is configured such that discharged oil from a third pump is supplied into a boom cylinder when only a boom switching valve provided to a first circuit system is switched, discharged oil from the third pump is supplied to an arm cylinder when only an arm switching valve is switched, and discharged oil from the third pump is preferentially supplied to the arm cylinder when the boom switching valve and the arm switching valve are simultaneously switched.

Specifically, the above-described control circuit includes a hydraulic accelerating valve for preferentially supplying discharged oil from the third pump to the arm cylinder. The hydraulic accelerating valve includes two pilot chambers to which a pilot pressure of the boom switching valve and a pilot pressure of the arm switching valve are respectively led, and a spring that imparts a biasing force in the same direction as the pilot pressure of the arm switching valve.

The hydraulic accelerating valve switches so as to supply discharged oil from the third pump to the boom cylinder by means of the pilot pressure of the boom switching valve overcoming the biasing force of the spring when only the pilot pressure of the boom switching valve acts, and switches so as to supply discharged oil from the third pump to the arm cylinder by means of the pilot pressure of the arm switching valve and the biasing force of the spring when only the pilot pressure of the arm switching valve acts. Further, the hydraulic accelerating valve switches so as to supply discharged oil from the third pump to the arm cylinder by means of a combined force of the pilot pressure of the arm switching valve and the biasing force of the spring overcoming the pilot pressure of the boom switching valve when the pilot pressures of both the boom switching valve and the arm switching valve act.

SUMMARY OF INVENTION

In the control circuit disclosed in JP1998-88627A, the biasing force of the spring of the hydraulic accelerating valve must be set to a size that is smaller than the pilot pressure of the boom switching valve and overcomes a differential pressure of the two pilot pressures. Thus, there has been a problem in that the selection of the spring is difficult.

An object of the present invention is to provide a fluid pressure control device for a power shovel that eliminates the need for the conventionally difficult selection of a spring.

According to one aspect of the present invention, a fluid pressure control device for a power shovel is provided. The fluid pressure control device includes a first pump configured to supply working fluid to a first actuator, a second pump configured to supply working fluid to a second actuator, a first switching valve configured to enable or block communication between the first pump and the first actuator, a second switching valve configured to enable or block communication between the second pump and the second actuator, a third pump configured to be capable of supplying working fluid to the first and second actuators, a first merge control valve provided on a downstream side of the third pump, the first merge control valve having a tank communication position in which the third pump and a tank are in communication and a downstream-side communication position in which the third pump and a downstream side are in communication, the first merge control valve being configured to switch between the tank communication position and the downstream-side communication position, and a second merge control valve provided on a downstream side of the first merge control valve, the second merge control valve having a first actuator communication position in which the third pump and the first actuator are in communication and a first actuator blocked position in which communication between the third pump and the first actuator is blocked, the second merge control valve being configured to switch between the first actuator communication position and the first actuator blocked position. The first merge control valve is maintained in the tank communication position by a biasing force of a biasing member, and the first merge control valve is switched from the tank communication position to the downstream-side communication position by a first pilot pressure for enabling communication between the first pump and the first actuator by the first switching valve, or a second pilot pressure for enabling communication between the second pump and the second actuator by the second switching valve, and the second merge control valve is maintained in the first actuator communication position by a biasing force of a biasing member, and the second merge control valve is switched from the first actuator communication position to the first actuator blocked position by the second pilot pressure.

According to another aspect of the present invention, a fluid pressure control device for a power shovel is provided. The fluid pressure control device includes a first pump configured to supply working fluid to a first actuator, a second pump configured to supply working fluid to a second actuator, a first switching valve configured to enable or block communication between the first pump and the first actuator, a second switching valve configured to enable or block communication between the second pump and the second actuator, a third pump configured to be capable of supplying working fluid to the first and second actuators, a first merge control valve provided on a downstream side of the third pump, the first merge control valve having a first neutral position that is maintained by a biasing force of a biasing member and a first pilot pressure position that is maintained by a first pilot pressure for enabling communication between the first pump and the first actuator by the first switching valve, the first merge control valve being configured to switch the communication state between the third pump and a downstream side by switching between the first neutral position and the first pilot pressure position, and a second merge control valve provided on a downstream side of the first merge control valve, the second merge control valve having a second neutral position that is maintained by a biasing force of a biasing member and a second pilot pressure position that is maintained by a second pilot pressure for enabling communication between the second pump and the second actuator by the second switching valve, the second merge control valve being configured to switch the communication state between the first merge control valve and a tank or the first actuator by switching between the second neutral position and the second pilot pressure position. The third pump and the tank are in communication when the first merge control valve is in the first neutral position and the second merge control valve is in the second neutral position, the third pump and the first actuator are in communication when the first merge control valve is in the first pilot pressure position and the second merge control valve is in the second neutral position, communication between the third pump and the first actuator is blocked when the first merge control valve is in the first neutral position and the second merge control valve is in the second pilot pressure position, and communication between the third pump and the first actuator is blocked when the first merge control valve is in the first pilot pressure position and the second merge control valve is in the second pilot pressure position.

According to another aspect of the present invention, a fluid pressure control device for a power shovel is provided. The fluid pressure control device includes a first pump configured to supply working fluid to a boom cylinder, a second pump configured to supply working fluid to an arm cylinder, a boom switching valve connected to a boom system pilot pressure introduction path which leads a first pilot pressure for enabling or blocking communication between the first pump and the boom cylinder, an arm switching valve connected to an arm system pilot pressure introduction path which leads a second pilot pressure for enabling or blocking communication between the second pump and the arm cylinder, a third pump configured to be capable of supplying working fluid to the boom cylinder and the arm cylinder, a center bypass passage configured to enable communication between the third pump and a tank, a boom merge passage that is parallel to the center bypass passage and is connected to the boom switching valve, a first merge control valve that is connected to the center bypass passage and the boom merge passage and has a first pilot chamber connected to the boom system pilot pressure introduction path, an arm merge passage that branches from the center bypass passage at a downstream side of the first merge control valve and is connected to the arm switching valve, and a second merge control valve that is connected to the center bypass passage, the boom merge passage, and the arm merge passage and has a second pilot chamber connected to the arm system pilot pressure introduction path. The first merge control valve has a first neutral position maintained by a biasing force of a biasing member in which the third pump and the tank are in communication, and a first pilot pressure position in which the third pump and the boom switching valve are in communication when the first pilot pressure is led to the first pilot chamber, and the second merge control valve has a second neutral position maintained by a biasing force of a biasing member in which the third pump is communication with the tank and the boom switching valve, and a second pilot pressure position in which communication between the third pump and the boom switching valve is blocked when the second pilot pressure is led to the second pilot chamber. The third pump and the tank are in communication when the first merge control valve is in the first neutral position and the second merge control valve is in the second neutral position, the third pump and the boom switching valve are in communication when the first merge control valve is in the first pilot pressure position and the second merge control valve is in the second neutral position, communication between the third pump and the boom switching valve is blocked when the first merge control valve is in the first neutral position and the second merge control valve is in the second pilot pressure position, and communication between the third pump and the boom switching valve is blocked when the first merge control valve is in the first pilot pressure position and the second merge control valve is in the second pilot pressure position.

DESCRIPTION OF EMBODIMENTS

Embodiments of the present invention will now be explained with reference to the drawings. The fluid pressure control device for a power shovel (hereinafter referred to simply as a "fluid pressure control device") according to the first to third embodiments shown in FIGS. 1 to 3 utilizes hydraulic oil as a working fluid, and controls the operation of actuators that are installed in a power shovel.

Figure 1:
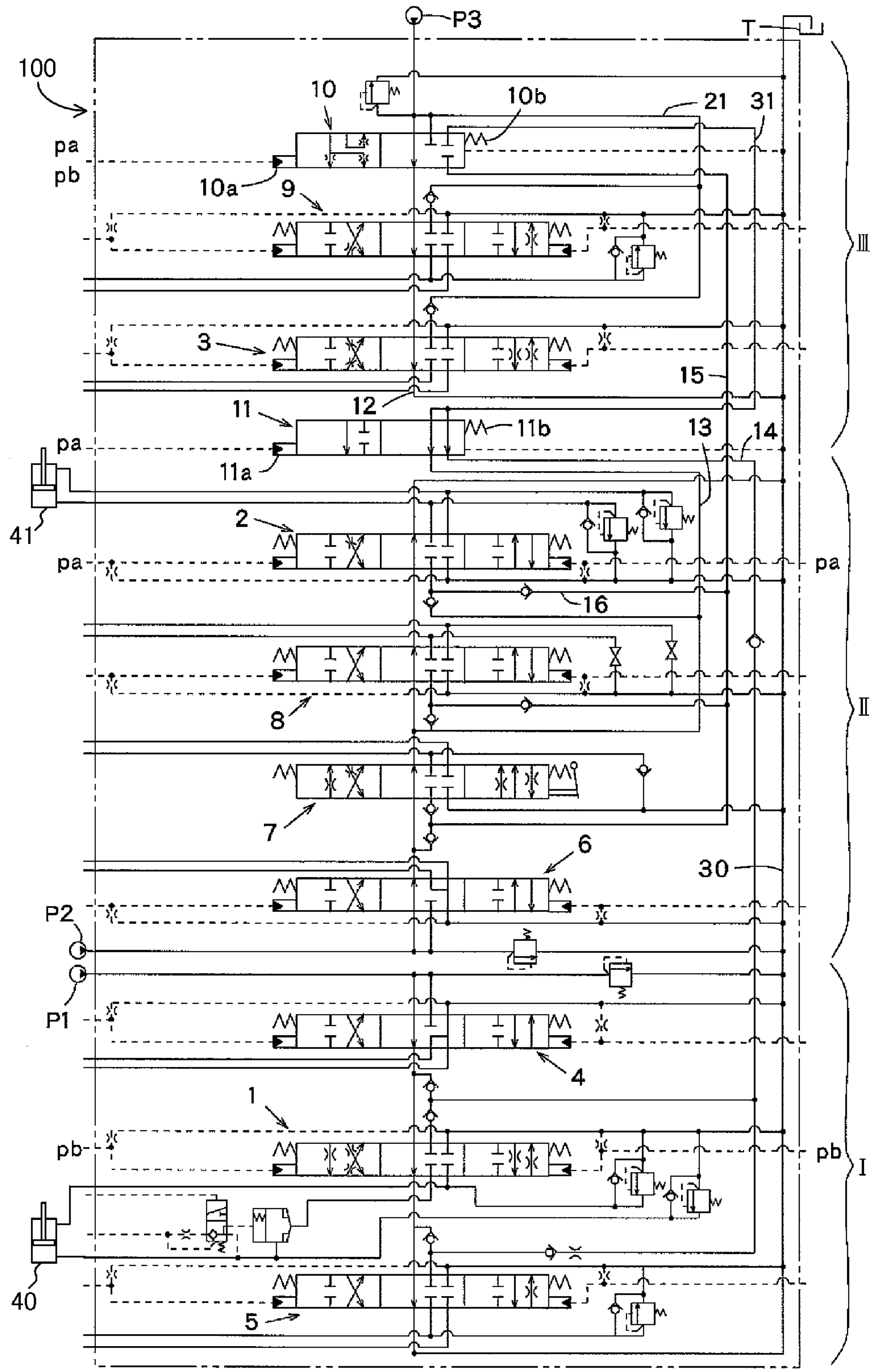
FIG. 1 is a circuit diagram of a fluid pressure control device for a power shovel according to a first embodiment of the present invention.

The fluid pressure control device 100 according to the first embodiment shown in FIG. 1 includes the following: a first pump P1 that supplies working oil to a boom cylinder 40, a second pump P2 that supplies working oil to an arm cylinder 41, a third pump P3 that supplies working oil to a slewing motor, a boom switching valve 1 that is provided between the first pump P1 and the boom cylinder 40 and enables or blocks communication between the first pump P1 and the boom cylinder 40, an arm switching valve 2 that is provided between the second pump P2 and the arm cylinder 41 and enables or blocks communication between the second pump P2 and the arm cylinder 41, and a slewing switching valve 3 that is provided between the third pump P3 and the slewing motor and enables or blocks communication between the third pump P3 and the slewing motor.

In the first embodiment, the boom cylinder 40 corresponds to a first actuator, and the boom switching valve 1 corresponds to a first switching valve. Further, the arm cylinder 41 corresponds to a second actuator and the arm switching valve 2 corresponds to a second switching valve.

The fluid pressure control device 100 further includes a first circuit system I that is connected to the first pump P1 and provided with the switching valve 1, a second circuit system II that is connected to the second pump P2 and provided with the switching valve 2, and a third circuit system III that is connected to the third pump P3 and provided with the switching valve 3.

In addition to the boom switching valve 1, the first circuit system I is provided with a left-side travel motor switching valve 4 and a bucket switching valve 5 to which discharged oil from the first pump P1 is supplied. Discharged oil from the first pump P1 is supplied to the switching valves 1 and 5 only when the travel motor switching valve 4 is in the normal position (the state shown in FIG. 1). In this way, in the first circuit system I, discharged oil from the first pump P1 is preferentially supplied to the travel motor switching valve 4.

In addition to the arm switching valve 2, the second circuit system II is provided with a right-side travel motor switching valve 6, a boom swing switching valve 7, and a backup actuator switching valve 8 to which discharged oil from the second pump P2 is supplied. In the second circuit system II as well, discharged oil from the second pump P2 is preferentially supplied to the travel motor switching valve 6.

In addition to the slewing switching valve 3, the third circuit system III is also provided with a dozer switching valve 9, a first merge control valve 10, and a second merge control valve 11 to which discharged oil from the third pump P3 is supplied. A center bypass passage 12 is connected to the third pump P3. The center bypass passage 12 leads discharged oil from the third pump P3 to a tank passage 30 connected to a tank T when the switching valves 10, 9, and 3 provided to the third circuit system III are in the normal position.

The first merge control valve 10 is downstream of the third pump P3, and is provided at the most upstream point of the center bypass passage 12 in the third circuit system III. The second merge control valve 11 is provided between the first merge control valve 10 and the arm switching valve 2.

A parallel passage 21 that is connected in parallel to the dozer switching valve 9 and the slewing switching valve 3 is connected to a passage that connects the third pump P3 and the first merge control valve 10. When one of the switching valves 3 and 9 is switched and communication is blocked between the center bypass passage 12 and the tank passage 30, discharged oil from the third pump P3 is supplied to the dozer switching valve 9 or the slewing switching valve 3 through the parallel passage 21.

A boom system pilot pressure introduction path pb which leads a first pilot pressure for switching the boom switching valve 1 and an arm system pilot pressure introduction path pa which leads a second pilot pressure for switching the arm switching valve 2 are connected to a pilot chamber 10*a* of the first merge control valve 10.

The boom system pilot pressure introduction path pb is in communication with a passage to which the first pilot pressure for switching the boom switching valve 1 is led, this passage being connected to both pilot chambers of the boom switching valve 1. The arm system pilot pressure introduction path pa is in communication with a passage to which the second pilot pressure for switching the arm switching valve 2 is led, this passage being connected to both pilot chambers of the arm switching valve 2.

When neither of the first pilot pressure and the second pilot pressure is being led to the pilot chamber 10*a*, the first merge control valve 10 is maintained in a normal position (the state shown in FIG. 1) by a biasing force of a spring 10*b* that serves as a biasing member. When the first merge control valve 10 is in the normal position, discharged oil that is supplied to the center bypass passage 12 is led to the tank passage 30.

On the other hand, when the first or second pilot pressure is led to the pilot chamber 10*a*, the first merge control valve 10 switches to a switched position, and discharged oil from the third pump P3 is supplied to the center bypass passage 12, a merge passage 31, and a parallel passage 15.

In the switched position of the first merge control valve 10, the third pump P3 is also in communication with the center bypass passage 12 via a restriction. However, this restriction mostly blocks communication between the third pump P3 and the center bypass passage 12. Therefore, in the switched position of the first merge control valve 10, discharged oil from the third pump P3 is preferentially supplied to the merge passage 31 and the parallel passage 15.

In the first embodiment, the normal position of the first merge control valve 10 corresponds to a tank communication position, and the switched position corresponds to a downstream-side communication position. The first merge control valve 10 may also be configured such that in the switched position, communication between the third pump P3 and the center bypass passage 12 is completely blocked.

When the first merge control valve 10 is in the switched position, the merge passage 31 is connected in parallel with the center bypass passage 12 to the third pump P3. The merge passage 31 branches upstream of the second merge control valve 11 and is connected to a boom merge passage 14 and an arm merge passage 13 via the second merge control valve 11. The boom merge passage 14 is a passage that supplies discharged oil from the third pump P3 to the boom switching valve 1, and the arm merge passage 13 is a passage that supplies discharged oil from the third pump P3 to the arm switching valve 2. In the first embodiment, a passage consisting of the merge passage 31 and the boom merge passage 14 corresponds to a boom merge passage.

The arm system pilot pressure introduction path pa is connected to a pilot chamber 11*a* of the second merge control valve 11. When the second pilot pressure is not being led to the pilot chamber 11*a*, the second merge control valve 11 is maintained in the normal position (the state shown in FIG. 1) by a biasing force of a spring 11*b* that serves as a biasing member. When the second pilot pressure is led to the pilot chamber 11*a*, the second merge control valve 11 switches to a switched position.

In the normal position of the second merge control valve 11, the boom merge passage 14 and the arm merge passage 13 are in simultaneous communication, whereas in the switched position, the boom merge passage 14 is blocked and only the arm merge passage 13 is in communication.

In the first embodiment, the normal position of the second merge control valve 11 corresponds to a first actuator communication position, and the switched position corresponds to a first actuator blocked position in which communication between the third pump P3 and the boom cylinder 40 is blocked. The arm merge passage 13 can also be configured to connect with the third pump P3 without involving the second merge control valve 11.

In the fluid pressure control device according to the first embodiment, discharged oil from the first pump P1 is supplied to the boom switching valve 1, the left-side travel motor switching valve 4, and the bucket switching valve 5 provided to the first circuit system I, and discharged oil from the second pump P2 is supplied to the arm switching valve 2, the right-side travel motor switching valve 6, the boom swing switching valve 7, and the backup actuator switching valve 8 provided to the second circuit system II.

Discharged oil from the third pump P3 is supplied to the slewing switching valve 3 and the dozer switching valve 9 provided to the third circuit system III, but when the switching valves 3, 9, and 10 provided to the third circuit system III are in the normal position, discharged oil from the third pump P3 is returned to the tank T through the center bypass passage 12 and the tank passage 30.

Next, a case in which discharged oil from the third pump P3 merges with discharged oil from the second pump P2 and is supplied to the arm switching valve 2, or a case in which discharged oil from the third pump P3 merges with discharged oil from the first pump P1 and is supplied to the boom switching valve 1 will be explained.

If the arm cylinder 41 is not operated, or in other words if the arm switching valve 2 is maintained in the normal position, the second pilot pressure is not led to the pilot chamber 11*a* of the second merge control valve 11, and the second merge control valve 11 is maintained in the normal position. At this time, the boom merge passage 14 and the arm merge passage 13 are in communication with the merge passage 31 via the second merge control valve 11.

In this state, if the boom switching valve 1 is switched, the first pilot pressure of the boom system pilot pressure introduction path pb acts on the pilot chamber 10*a*, and the first merge control valve 10 switches to the switched position on the left side in FIG. 1. In the switched position, in addition to the parallel passage 21 to which it is always connected, the third pump P3 is also in communication with the merge passage 31, the parallel passage 15, and the center bypass passage 12. The merge passage 31 is in communication with the boom merge passage 14 at the second merge control valve 11, and thus discharged oil from the third pump P3 is supplied to the boom cylinder 40 through the merge passage 31, the boom merge passage 14, and the boom switching valve 1.

At this time, the third pump P3 is also in communication with the bucket switching valve 5 that is connected in parallel with the boom switching valve 1 to the boom merge passage 14. Thus, discharged oil from the third pump P3 merges with discharged oil from the first pump P1 and is also supplied to the bucket switching valve 5. Further, the third pump P3 is also in communication with the parallel passage 15 through the first merge control valve 10. Thus, discharged oil from the third pump P3 merges with discharged oil from the second pump P2 and is also supplied to the switching valves 7 and 8 of the second circuit system II that is connected to the parallel passage 15.

In this state, when the switching valves 3 and 9 of the third circuit system III are in the normal position (the state shown in FIG. 1), the center bypass passage 12 is in communication with the tank passage 30, but the center bypass passage 12 is restricted by the restriction of the first merge control valve 10. Thus, discharged oil from the third pump P3 is preferentially supplied to the merge passage 31 and the parallel passage 15.

On the other hand, in a state in which the first merge control valve 10 is maintained in the switched position, if the arm switching valve 2 is switched, the second pilot pressure of the arm system pilot pressure introduction path pa acts on the pilot chamber 11*a*, and the second merge control valve 11 switches to the switched position on the left side in FIG. 1. In the switched position of the second merge control valve 11, communication between the merge passage 31 and the boom merge passage 14 is blocked, and communication between the merge passage 31 and the arm merge passage 13 is enabled. Therefore, discharged oil from the third pump P3 is not supplied to the boom switching valve 1, but is supplied to the arm cylinder 41 through the arm switching valve 2.

Further, the third pump P3 is also in communication with the parallel passage 15 through the first merge control valve 10, and thus discharged oil from the third pump P3 is supplied to the arm cylinder 41 through not only the arm merge passage 13 but also the parallel passage 15, a passage 16, and the arm switching valve 2.

As described above, in the fluid pressure control device according to the first embodiment, when the arm is operating, or in other words when the second pump P2 and the arm cylinder 41 are in communication, communication between the third pump P3 and the boom merge passage 14 is blocked regardless of the switching operation of the boom switching valve 1, i.e. regardless of whether or not communication is enabled between the first pump P1 and the boom cylinder 40. In other words, more discharged oil for merging that is discharged from the third pump P3 is preferentially supplied to the arm cylinder 41 than the boom cylinder 40.

Therefore, when discharged oil from the third pump P3 merges into the arm switching valve 2, the flow amount of discharged oil that is supplied to the arm cylinder 41 does not decrease even if the boom switching valve 1 switches. Thus, for example, in a power shovel, it is possible to perform control suited to an operation in which the speed of the arm should be increased such as horizontal pulling.

Further, the second merge control valve 11 switches only by a pilot pressure from the arm system pilot pressure introduction path pa, and thus it is not necessary to select a spring that satisfies a predetermined relationship with the pilot pressure as in the conventional control circuit.

According to the present embodiment, the following effects are achieved.

When the arm switching valve 2 is switched, communication between the third pump P3 and the boom switching valve 1 is blocked regardless of whether or not the boom switching valve 1 is switched. Therefore, working oil that is discharged from the third pump P3 can be preferentially supplied to the arm cylinder 41 through the arm switching valve 2.

Further, discharged oil from the third pump P3 can be preferentially supplied to the arm cylinder 41 only by switching the arm switching valve 2 regardless of whether or not the boom switching valve 1 is switched.

In this way, the need for the conventionally difficult selection of a spring can be eliminated, and discharged oil from the third pump P3 can be preferentially supplied to the arm cylinder 41 during simultaneous operation of the boom cylinder 40 and the arm cylinder 41.

Figure 2:
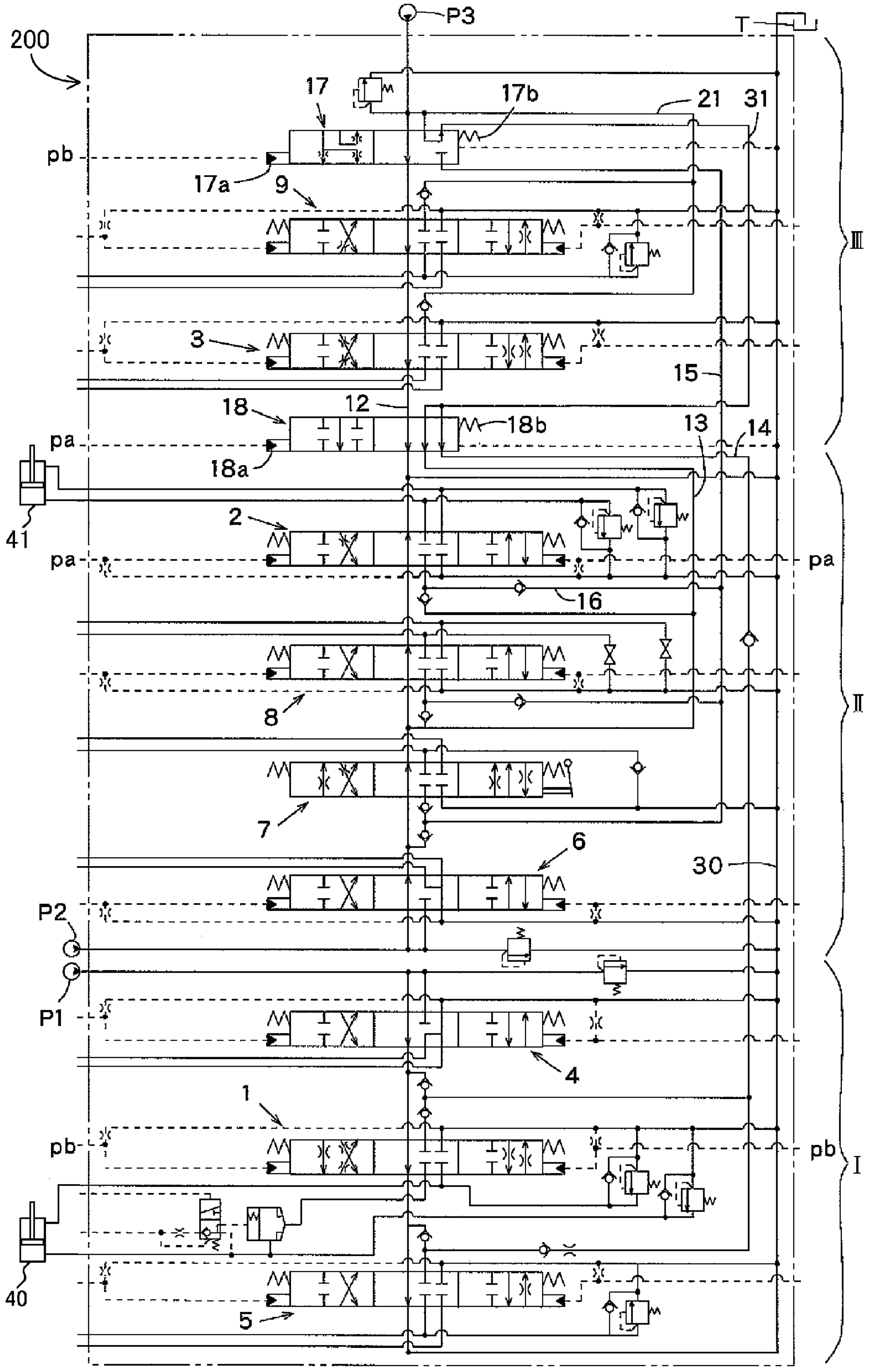
FIG. 2 is a circuit diagram of a fluid pressure control device for a power shovel according to a second embodiment of the present invention.

Similar to the first embodiment shown in FIG. 1, a fluid pressure control device 200 according to a second embodiment shown in FIG. 2 comprises the first, second, and third circuit systems I, II, and III to which the first, second, and third pumps P1, P2, and P3 are connected. The constitutions of the valves provided to each circuit system are the same as those in the first embodiment. Constituent elements that are identical to those in the first embodiment will be assigned the same reference numerals as used in FIG. 1, and detailed explanations of these constituent elements will be omitted.

In the second embodiment as well, the boom cylinder 40 corresponds to a first actuator, and the boom switching valve 1 corresponds to a first switching valve. Further, the arm cylinder 41 corresponds to a second actuator and the arm switching valve 2 corresponds to a second switching valve.

The center bypass passage 12 is connected to the third pump P3. The center bypass passage 12 leads discharged oil from the third pump P3 to the tank passage 30 connected to the tank T when all of the switching valves 17, 9, 3, and 18 provided to the third circuit system III are in the normal position.

A first merge control valve 17 is downstream from the third pump P3, and is provided at the most upstream point of the center bypass passage 12 in the third circuit system III. A second merge control valve 18 is at the most downstream point of the center bypass passage 12, and is provided between the first merge control valve 17 and the arm switching valve 2.

The parallel passage 21 that is connected in parallel to the dozer switching valve 9 and the slewing switching valve 3 is connected to a passage that connects the third pump P3 and the first merge control valve 17. When one of the switching valves 3 and 9 is switched and communication is blocked between the center bypass passage 12 and the tank passage 30, discharged oil from the third pump P3 is supplied to the dozer switching valve 9 or the slewing switching valve 3 through the parallel passage 21.

The boom system pilot pressure introduction path pb which leads a first pilot pressure for switching the boom switching valve 1 is connected to a pilot chamber 17*a* of the first merge control valve 17. When the first pilot pressure is not being led to the pilot chamber 17*a*, the first merge control valve 17 is maintained in the normal position (the state shown in FIG. 2) by a biasing force of a spring 17*b* that serves as a biasing member.

When the first merge control valve 17 is in the normal position, discharged oil from the third pump P3 is supplied to the center bypass passage 12 and the merge passage 31. On the other hand, if the first pilot pressure is led to the pilot chamber 17*a*, the first merge control valve 17 switches to the switched position, and discharged oil from the third pump P3 is supplied to the center bypass passage 12, the merge passage 31, and the parallel passage 15.

In the switched position of the first merge control valve 17, the third pump P3 is also in communication with the center bypass passage 12 via a restriction. However, this restriction mostly blocks communication between the third pump P3 and the center bypass passage 12. Therefore, in the switched position of the first merge control valve 17, discharged oil from the third pump P3 is preferentially supplied to the merge passage 31 and the parallel passage 15 rather than the center bypass passage 12.

In the second embodiment, the normal position of the first merge control valve 17 corresponds to a first neutral position, and the switched position corresponds to a first pilot pressure position. The first merge control valve 17 may also be configured such that in the switched position, communication between the third pump P3 and the center bypass passage 12 is completely blocked.

When the first merge control valve 17 is in the switched position, the merge passage 31 is connected in parallel with the center bypass passage 12 to the third pump P3. The merge passage 31 branches upstream of the second merge control valve 18 and is connected to the boom merge passage 14 and the arm merge passage 13 via the second merge control valve 18. The boom merge passage 14 is a passage that supplies discharged oil from the third pump P3 to the boom switching valve 1, and the arm merge passage 13 is a passage that supplies discharged oil from the third pump P3 to the arm switching valve 2. In the second embodiment, a passage consisting of the merge passage 31 and the boom merge passage 14 corresponds to a boom merge passage.

The arm system pilot pressure introduction path pa which introduces a second pilot pressure for switching the arm switching valve 2 is connected to a pilot chamber 18*a* of the second merge control valve 18. When the second pilot pressure is not being led to the pilot chamber 18*a*, the second merge control valve 18 is maintained in the normal position (the state shown in FIG. 2) by a biasing force of a spring 18*b* that serves as a biasing member. When the second pilot pressure is led to the pilot chamber 18*a*, the second merge control valve 18 switches to a switched position. In the second embodiment, the normal position of the second merge control valve 18 corresponds to a second neutral position, and the switched position corresponds to a second pilot pressure position.

In the normal position of the second merge control valve 18, the center bypass passage 12, the boom merge passage 14, and the arm merge passage 13 are in simultaneous communication, whereas in the switched position, the center bypass passage 12 and the boom merge passage 14 are blocked and only the arm merge passage 13 is in communication.

In the fluid pressure control device according to the second embodiment, discharged oil from the first pump P1 is supplied to the boom switching valve 1, the left-side travel motor switching valve 4, and the bucket switching valve 5 provided to the first circuit system I, and discharged oil from the second pump P2 is supplied to the arm switching valve 2, the right-side travel motor switching valve 6, the boom swing switching valve 7, and the backup actuator switching valve 8 provided to the second circuit system II.

Discharged oil from the third pump P3 is supplied to the slewing switching valve 3 and the dozer switching valve 9 provided to the third circuit system III, but when all of the switching valves 3, 9, 17, and 18 provided to the third circuit system III are in the normal position, discharged oil from the third pump P3 is returned to the tank T through the center bypass passage 12 and the tank passage 30. When one of the slewing switching valve 3 and the dozer switching valve 9 provided to the third circuit system III is switched, communication between the center bypass passage 12 and the tank passage 30 is blocked.

Next, a case in which discharged oil from the third pump P3 merges with discharged oil from the second pump P2 and is supplied to the arm switching valve 2, or a case in which discharged oil from the third pump P3 merges with discharged oil from the first pump P1 and is supplied to the boom switching valve 1 will be explained.

If the arm cylinder 41 is not operated, or in other words if the arm switching valve 2 is maintained in the normal position, the second pilot pressure is not led to the pilot chamber 18*a* of the second merge control valve 18, and the second merge control valve 18 is maintained in the normal position. At this time, the boom merge passage 14 and the arm merge passage 13 are in communication with the merge passage 31 via the second merge control valve 18.

In this state, if the boom switching valve 1 is switched, the first pilot pressure of the boom system pilot pressure introduction path pb acts on the pilot chamber 17*a*, and the first merge control valve 17 switches to the switched position on the left side in FIG. 2. In the switched position, the third pump P3 is in communication with the center bypass passage 12, the merge passage 31, and the parallel passage 15. The merge passage 31 is in communication with the boom merge passage 14 at the second merge control valve 18, and thus discharged oil from the third pump P3 is supplied to the boom cylinder 40 through the merge passage 31, the boom merge passage 14, and the boom switching valve 1.

At this time, the third pump P3 is also in communication with the bucket switching valve 5 that is connected in parallel with the boom switching valve 1 to the boom merge passage 14. Thus, discharged oil from the third pump P3 merges with discharged oil from the first pump P1 and is also supplied to the bucket switching valve 5. Further, the third pump P3 is also in communication with the parallel passage 15 through the first merge control valve 17. Thus, discharged oil from the third pump P3 merges with discharged oil from the second pump P2 and is also supplied to the switching valves 7 and 8 of the second circuit system II that is connected to the parallel passage 15.

On the other hand, in a state in which the first merge control valve 17 is maintained in the switched position, if the arm switching valve 2 is switched, the second pilot pressure of the arm system pilot pressure introduction path pa acts on the pilot chamber 18*a*, and the second merge control valve 18 switches to the switched position on the left side in FIG. 2. In the switched position of the second merge control valve 18, the center bypass passage 12 is blocked and communication between the merge passage 31 and the boom merge passage 14 is blocked, and only communication between the merge passage 31 and the arm merge passage 13 is enabled. Therefore, discharged oil from the third pump P3 is not supplied to the boom switching valve 1, but is supplied to the arm cylinder 41 through the arm merge passage 13 and the arm switching valve 2.

Further, the third pump P3 is also in communication with the parallel passage 15 through the first merge control valve 17, and thus discharged oil from the third pump P3 is supplied to the arm cylinder 41 through not only the arm merge passage 13 but also the parallel passage 15, a passage 16, and the arm switching valve 2.

As described above, in the fluid pressure control device according to the second embodiment, when the arm is operating, or in other words when the second pump P2 and the arm cylinder 41 are in communication, communication between the third pump P3 and the boom merge passage 14 is blocked regardless of the switching operation of the boom switching valve 1, i.e. regardless of whether or not communication is enabled between the first pump P1 and the boom cylinder 40. In other words, more discharged oil for merging that is discharged from the third pump P3 is preferentially supplied to the arm cylinder 41 than the boom cylinder 40.

Therefore, when discharged oil from the third pump P3 merges into the arm switching valve 2, the flow amount of discharged oil that is supplied to the arm cylinder 41 does not decrease even if the boom switching valve 1 switches. Thus, for example, in a power shovel, it is possible to perform control suited to an operation in which the speed of the arm should be increased such as horizontal pulling.

Further, the second merge control valve 18 switches only by a pilot pressure from the arm system pilot pressure introduction path pa, and thus it is not necessary to select a spring that satisfies a predetermined relationship with the pilot pressure as in the conventional control circuit.

According to the present embodiment, the following effects are achieved.

When the arm switching valve 2 is switched, communication between the third pump P3 and the boom switching valve 1 is blocked regardless of whether or not the boom switching valve 1 is switched. Therefore, working oil that is discharged from the third pump P3 can be preferentially supplied to the arm cylinder 41 through the arm switching valve 2.

Further, discharged oil from the third pump P3 can be preferentially supplied to the arm cylinder 41 only by switching the arm switching valve 2 regardless of whether or not the boom switching valve 1 is switched.

In this way, the need for the conventionally difficult selection of a spring can be eliminated, and discharged oil from the third pump P3 can be preferentially supplied to the arm cylinder 41 during simultaneous operation of the boom cylinder 40 and the arm cylinder 41.

In the first and second embodiments, the boom cylinder 40 is used as a first actuator and the arm cylinder 41 is used as a second actuator. However, the fluid pressure control devices according to the first and second embodiments can preferentially supply discharged fluid from the third pump P3 to the second actuator regardless of what kind of actuator is used as the first and second actuators. Therefore, by changing the combination of the first and second actuators, various actuators can be used as the actuator to which discharged fluid from the third pump P3 is preferentially supplied.

Figure 3:
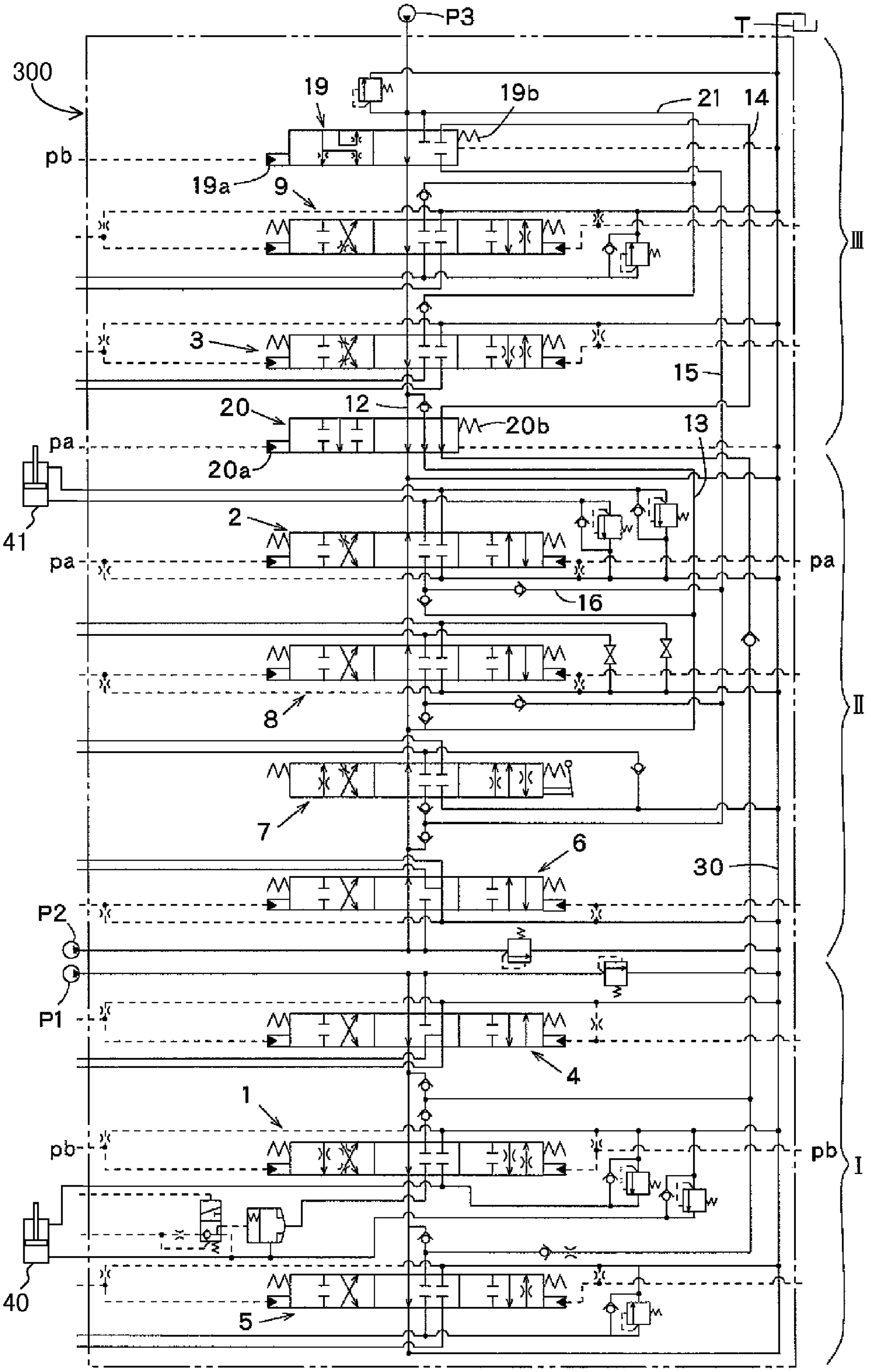
FIG. 3 is a circuit diagram of a fluid pressure control device for a power shovel according to a third embodiment of the present invention.

Similar to the first embodiment shown in FIG. 1, a fluid pressure control device 300 according to a third embodiment shown in FIG. 3 comprises the first, second, and third circuit systems I, II, and III to which the first, second, and third pumps P1, P2, and P3 are connected. The constitutions of the valves provided to each circuit system are the same as those in the first embodiment. Constituent elements that are identical to those in the first embodiment will be assigned the same reference numerals as used in FIG. 1, and detailed explanations of these constituent elements will be omitted.

The center bypass passage 12 is connected to the third pump P3. The center bypass passage 12 leads discharged oil from the third pump P3 to a tank passage 30 connected to the tank T when all of the switching valves 19, 9, 3, and 20 provided to the third circuit system III are in the normal position.

A first merge control valve 19 is downstream from the third pump P3, and is provided at the most upstream point of the center bypass passage 12 in the third circuit system III. The parallel passage 15 and the boom merge passage 14 are connected to the first merge control valve 19. A second merge control valve 20 is at the most downstream point of the center bypass passage 12, and is provided between the first merge control valve 19 and the arm switching valve 2.

The parallel passage 21 that is connected in parallel to the dozer switching valve 9 and the slewing switching valve 3 is connected to a passage that connects the third pump P3 and the first merge control valve 19. When one of the switching valves 3 and 9 is switched and communication is blocked between the center bypass passage 12 and the tank passage 30, discharged oil from the third pump P3 is supplied to the dozer switching valve 9 or the slewing switching valve 3 through the parallel passage 21.

The boom system pilot pressure introduction path pb which leads a first pilot pressure for switching the boom switching valve 1 is connected to a pilot chamber 19*a* of the first merge control valve 19. When the first pilot pressure is not being led to the pilot chamber 19*a*, the first merge control valve 19 is maintained in the normal position (the state shown in FIG. 3) by a biasing force of a spring 19*b* that serves as a biasing member. In the third embodiment, the normal position of the first merge control valve 19 corresponds to a first neutral position, and the switched position corresponds to a first pilot pressure position.

When the first merge control valve 19 is in the normal position, discharged oil from the third pump P3 is led to the center bypass passage 12. On the other hand, if the first pilot pressure is led to the pilot chamber 19*a*, the first merge control valve 19 switches to the switched position, and discharged oil from the third pump P3 is supplied to the center bypass passage 12, the boom merge passage 14, and the parallel passage 15.

In the switched position of the first merge control valve 19, the third pump P3 is also in communication with the center bypass passage 12 via a restriction. However, this restriction mostly blocks communication between the third pump P3 and the center bypass passage 12. Therefore, in the switched position of the first merge control valve 19, discharged oil from the third pump P3 is preferentially supplied to the boom merge passage 14 and the parallel passage 15. The first merge control valve 19 can also be configured such that communication between the third pump P3 and the center bypass passage 12 is completely blocked in the switched position.

When the first merge control valve 19 is in the switched position, the boom merge passage 14 is connected in parallel with the center bypass passage 12 to the third pump P3. The boom merge passage 14 is in communication with the boom switching valve 1 via the second merge control valve 20. Therefore, when the boom switching valve 1 is switched and communication is enabled between the first pump P1 and the boom cylinder 40, the first merge control valve 19 also switches, and thus discharged oil from the third pump P3 is supplied to the boom cylinder 40 through the boom merge passage 14 and the boom switching valve 1.

The arm system pilot pressure introduction path pa is connected to a pilot chamber 20*a* of the second merge control valve 20. When the second pilot pressure is not being led to the pilot chamber 20*a,* the second merge control valve 20 is maintained in the normal position (the state shown in FIG. 3) by a biasing force of a spring 20*b* that serves as a biasing member. When the second pilot pressure is led to the pilot chamber 20*a,* the second merge control valve 20 switches to a switched position. In the third embodiment, the normal position of the second merge control valve 20 corresponds to a second neutral position, and the switched position corresponds to a second pilot pressure position.

The arm merge passage 13, which branches from the center bypass passage 12 at the upstream side of the second merge control valve 20 and is connected to the arm switching valve 2 at the downstream side, is connected to the second merge control valve 20. In the normal position of the second merge control valve 20, the center bypass passage 12, the boom merge passage 14, and the arm merge passage 13 are in simultaneous communication, whereas in the switched position, the boom merge passage 14 and the center bypass passage 12 are blocked and only the arm merge passage 13 is in communication.

In the fluid pressure control device according to the third embodiment, discharged oil from the first pump P1 is supplied to the boom switching valve 1, the left-side travel motor switching valve 4, and the bucket switching valve 5 provided to the first circuit system I, and discharged oil from the second pump P2 is supplied to the arm switching valve 2, the right-side travel motor switching valve 6, the boom swing switching valve 7, and the backup actuator switching valve 8 provided to the second circuit system II.

Discharged oil from the third pump P3 is supplied to the slewing switching valve 3 and the dozer switching valve 9 provided to the third circuit system III, but when all of the switching valves 3, 9, 19, and 20 provided to the third circuit system III are in the normal position, discharged oil from the third pump P3 is returned to the tank T through the center bypass passage 12 and the tank passage 30.

Next, a case in which discharged oil from the third pump P3 merges with discharged oil from the second pump P2 and is supplied to the arm switching valve 2, or a case in which discharged oil from the third pump P3 merges with discharged oil from the first pump P1 and is supplied to the boom switching valve 1 will be explained.

If the arm cylinder 41 is not operated, or in other words if the arm switching valve 2 is maintained in the normal position, the second pilot pressure is not led to the pilot chamber 20*a* of the second merge control valve 20, and the second merge control valve 20 is maintained in the normal position. At this time, the boom merge passage 14 is in communication.

In this state, if the boom switching valve 1 is switched, the first pilot pressure of the boom system pilot pressure introduction path pb acts on the pilot chamber 19*a*, and the first merge control valve 19 switches to the switched position on the left side in FIG. 3. In the switched position, the third pump P3 is in communication with the boom merge passage 14, the parallel passage 15, and the center bypass passage 12. The boom merge passage 14 is in communication with the second merge control valve 20, and thus discharged oil from the third pump P3 is supplied to the boom cylinder 40 through the boom merge passage 14 and the boom switching valve 1.

At this time, the third pump P3 is also in communication with the bucket switching valve 5 that is connected in parallel with the boom switching valve 1 to the boom merge passage 14. Thus, discharged oil from the third pump P3 is also supplied to the bucket switching valve 5. Further, the third pump P3 is also in communication with the parallel passage 15 through the first merge control valve 19. Thus, discharged oil from the third pump P3 is also supplied to the switching valves 7 and 8 of the second circuit system II that is connected to the parallel passage 15.

In this state, the center bypass passage 12 is in communication with the tank passage 30 via the second merge control valve 20 in the normal position. For example, even if the other switching valves in the third circuit system III are all in the normal position and the center bypass passage 12 is in communication with the tank passage 30, the center bypass passage 12 is restricted by the restriction provided to the first merge control valve 19. Thus, discharged oil from the third pump P3 is preferentially supplied to the boom merge passage 14 and the parallel passage 15.

On the other hand, in a state in which the first merge control valve 19 is maintained in the switched position, if the arm switching valve 2 is switched, the second pilot pressure acts on the pilot chamber 20*a* of the second merge control valve 20, and the second merge control valve 20 switches to the switched position on the left side in FIG. 3. In the switched position of the second merge control valve 20, the center bypass passage 12 and the boom merge passage 14 are blocked and only the arm merge passage 13 is in communication. Therefore, discharged oil from the third pump P3 is not supplied to the boom switching valve 1, but is supplied to the arm cylinder 41 through the arm merge passage 13 and the arm switching valve 2.

Further, the third pump P3 is also in communication with the parallel passage 15 through the first merge control valve 19, and thus discharged oil from the third pump P3 is supplied to the arm cylinder 41 through not only the arm merge passage 13 but also the parallel passage 15, a passage 16, and the arm switching valve 2. In the third embodiment, a passage consisting of the parallel passage 15 and the passage 16 corresponds to a second arm merge passage.

As described above, in the fluid pressure control device according to the third embodiment, when the arm is operating, or in other words when the second pump P2 and the arm cylinder 41 are in communication, communication between the third pump P3 and the boom merge passage 14 is blocked regardless of the switching operation of the boom switching valve 1, i.e. regardless of whether or not communication is enabled between the first pump P1 and the boom cylinder 40. In other words, more discharged oil for merging that is discharged from the third pump P3 is preferentially supplied to the arm cylinder 41 than the boom cylinder 40.

Therefore, when discharged oil from the third pump P3 merges into the arm switching valve 2, the flow amount of discharged oil that is supplied to the arm cylinder 41 does not decrease even if the boom switching valve 1 switches. Thus, for example, in a power shovel, it is possible to perform control suited to an operation in which the speed of the arm should be increased such as horizontal pulling.

Further, the second merge control valve 20 switches only by a pilot pressure from the arm system pilot pressure introduction path pa, and thus it is not necessary to select a spring that satisfies a predetermined relationship with the pilot pressure as in the conventional control circuit.

According to the present embodiment, the following effects are achieved.

When the arm switching valve 2 is switched, communication between the third pump P3 and the boom switching valve 1 is blocked regardless of whether or not the boom switching valve 1 is switched. Therefore, working oil that is discharged from the third pump P3 can be preferentially supplied to the arm cylinder 41 through the arm switching valve 2.

Further, discharged oil from the third pump P3 can be preferentially supplied to the arm cylinder 41 only by switching the arm switching valve 2 regardless of whether or not the boom switching valve 1 is switched.

In this way, the need for the conventionally difficult selection of a spring can be eliminated, and discharged oil from the third pump P3 can be preferentially supplied to the arm cylinder 41 during simultaneous operation of the boom cylinder 40 and the arm cylinder 41.

In the first to third embodiments, hydraulic oil is used as the working fluid. However, in addition to oil, another liquid such as water or a gas such as air can also be used as the working fluid.

Embodiments of the present invention were described above, but the above embodiments are merely examples of applications of the present invention, and the technical scope of the present invention is not limited to the specific constitutions of the above embodiments.

This application claims priority based on Japanese Patent Application No. 2012-245070 filed with the Japan Patent Office on Nov. 7, 2012, the entire contents of which are incorporated into this specification.

The invention claimed is:

1. A fluid pressure control device for a power shovel, comprising:

a first pump configured to supply working fluid to a first actuator;

a second pump configured to supply working fluid to a second actuator;

a first switching valve configured to enable or block communication between the first pump and the first actuator;

a second switching valve configured to enable or block communication between the second pump and the second actuator;

a third pump configured to be capable of supplying working fluid to the first and second actuators;

a first merge control valve provided on a downstream side of the third pump, the first merge control valve having a tank communication position in which the third pump and a tank are in communication and a downstream-side communication position in which the third pump and a downstream side are in communication, the first merge control valve being configured to switch between the tank communication position and the downstream-side communication position; and a second merge control valve provided on a downstream side of the first merge control valve, the second merge control valve having a first actuator communication position in which the third pump and the first actuator are in communication and a first actuator blocked position in which communication between the third pump and the first actuator is blocked, the second merge control valve being configured to switch between the first actuator communication position and the first actuator blocked position, wherein the first merge control valve is maintained in the tank communication position by a biasing force of a biasing member, and the first merge control valve is switched from the tank communication position to the downstream-side communication position by a first pilot pressure for enabling communication between the first pump and the first actuator by the first switching valve, or a second pilot pressure for enabling communication between the second pump and the second actuator by the second switching valve, and the second merge control valve is maintained in the first actuator communication position by a biasing force of a biasing member, and the second merge control valve is switched from the first actuator communication position to the first actuator blocked position by the second pilot pressure.

2. A fluid pressure control device for a power shovel, comprising:

a first pump configured to supply working fluid to a first actuator;

a second pump configured to supply working fluid to a second actuator;

a first switching valve configured to enable or block communication between the first pump and the first actuator;

a second switching valve configured to enable or block communication between the second pump and the second actuator;

a third pump configured to be capable of supplying working fluid to the first and second actuators;

a first merge control valve provided on a downstream side of the third pump, the first merge control valve having a first neutral position that is maintained by a biasing force of a biasing member and a first pilot pressure position that is maintained by a first pilot pressure for enabling communication between the first pump and the first actuator by the first switching valve, the first merge control valve being configured to switch the communication state between the third pump and a downstream side by switching between the first neutral position and the first pilot pressure position; and a second merge control valve provided on a downstream side of the first merge control valve, the second merge control valve having a second neutral position that is maintained by a biasing force of a biasing member and a second pilot pressure position that is maintained by a second pilot pressure for enabling communication between the second pump and the second actuator by the second switching valve, the second merge control valve being configured to switch the communication state between the first merge control valve and a tank or the first actuator by switching between the second neutral position and the second pilot pressure position, wherein the third pump and the tank are in communication when the first merge control valve is in the first neutral position and the second merge control valve is in the second neutral position, the third pump and the first actuator are in communication when the first merge control valve is in the first pilot pressure position and the second merge control valve is in the second neutral position, communication between the third pump and the first actuator is blocked when the first merge control valve is in the first neutral position and the second merge control valve is in the second pilot pressure position, and communication between the third pump and the first actuator is blocked when the first merge control valve is in the first pilot pressure position and the second merge control valve is in the second pilot pressure position.

3. A fluid pressure control device for a power shovel, comprising:

a first pump configured to supply working fluid to a boom cylinder;

a second pump configured to supply working fluid to an arm cylinder;

a boom switching valve connected to a boom system pilot pressure introduction path which leads a first pilot pressure for enabling or blocking communication between the first pump and the boom cylinder;

an arm switching valve connected to an arm system pilot pressure introduction path which leads a second pilot pressure for enabling or blocking communication between the second pump and the arm cylinder;

a third pump configured to be capable of supplying working fluid to the boom cylinder and the arm cylinder;

a center bypass passage configured to enable communication between the third pump and a tank;

a boom merge passage that is parallel to the center bypass passage and is connected to the boom switching valve;

a first merge control valve that is connected to the center bypass passage and the boom merge passage and has a first pilot chamber connected to the boom system pilot pressure introduction path;

an arm merge passage that branches from the center bypass passage at a downstream side of the first merge control valve and is connected to the arm switching valve; and a second merge control valve that is connected to the center bypass passage, the boom merge passage, and the arm merge passage and has a second pilot chamber connected to the arm system pilot pressure introduction path, wherein the first merge control valve has a first neutral position maintained by a biasing force of a biasing member in which the third pump and the tank are in communication, and a first pilot pressure position in which the third pump and the boom switching valve are in communication when the first pilot pressure is led to the first pilot chamber, the second merge control valve has a second neutral position maintained by a biasing force of a biasing member in which the third pump is communication with the tank and the boom switching valve, and a second pilot pressure position in which communication between the third pump and the boom switching valve is blocked when the second pilot pressure is led to the second pilot chamber, and wherein the third pump and the tank are in communication when the first merge control valve is in the first neutral position and the second merge control valve is in the second neutral position, the third pump and the boom switching valve are in communication when the first merge control valve is in the first pilot pressure position and the second merge control valve is in the second neutral position, communication between the third pump and the boom switching valve is blocked when the first merge control valve is in the first neutral position and the second merge control valve is in the second pilot pressure position, and communication between the third pump and the boom switching valve is blocked when the first merge control valve is in the first pilot pressure position and the second merge control valve is in the second pilot pressure position.

4. The fluid pressure control device for a power shovel according to claim 3, wherein a second arm merge passage configured to enable communication between the third pump and the arm switching valve is further connected to the first merge control valve, and the second arm merge passage enables communication between the third pump and the arm switching valve when the first merge control valve is in the first pilot pressure position.

* * * * *